United States Patent [19]
Masuda et al.

[11] 3,945,690
[45] Mar. 23, 1976

[54] FLUID-PRESSURE REGULATING VALVE

[75] Inventors: Naosuke Masuda; Itiro Yanagawa; Isao Suzuki, all of Higashimatsuyama, Japan

[73] Assignee: Jidosha Kiki Co., Ltd., Tokyo, Japan

[22] Filed: Dec. 6, 1974

[21] Appl. No.: 530,608

[30] Foreign Application Priority Data
Dec. 6, 1973   Japan.............................. 48-136654
Dec. 6, 1973   Japan.............................. 48-136655

[52] U.S. Cl.................................. 303/22 R; 303/40
[51] Int. Cl.²............................................ B60T 8/22
[58] Field of Search.......... 303/6 C, 22 R, 22 A, 40, 303/54

[56] References Cited
UNITED STATES PATENTS
3,484,138  12/1969   Cumming........................... 303/22 R
3,767,274  10/1973   Gruner et al...................... 303/22 R

*Primary Examiner*—Duane A. Reger
*Attorney, Agent, or Firm*—Stewart and Kolasch, Ltd.

[57] ABSTRACT

A fluid-pressure regulating valve for adjusting a supply pressure from either of two air reservoirs according to the payload of a vehicle and supplying the adjusted pressure to a control pressure chamber in a pressure-proportioning relay valve, the regulating valve comprising: a valve assembly for controlling the supply pressure, said assembly including a pressure piston reciprocably disposed in the valve body and formed with an air passage through the wall on one side, a supply valve accommodated in a supply pressure chamber inside the pressure piston and seated on a valve seat provided at the lower end of the supply pressure chamber, and an exhaust valve having an exhaust valve seat engageable with the supply valve and also having an upward protrusion extended through an exhaust bore formed in the axial center of the supply valve; an output pressure chamber defined between the underside of the pressure piston and the inner wall of the valve body; a balance spring disposed above the pressure piston in communication with the atmosphere to offset the upward force developed by the output pressure to raise the pressure piston; and a loading spring disposed under the exhaust valve to bias the supply valve into the open position via the exhaust valve; said upward protrusion of the exhaust valve being linked at its end with a linkwork movable in response to the vehicle payload.

6 Claims, 6 Drawing Figures

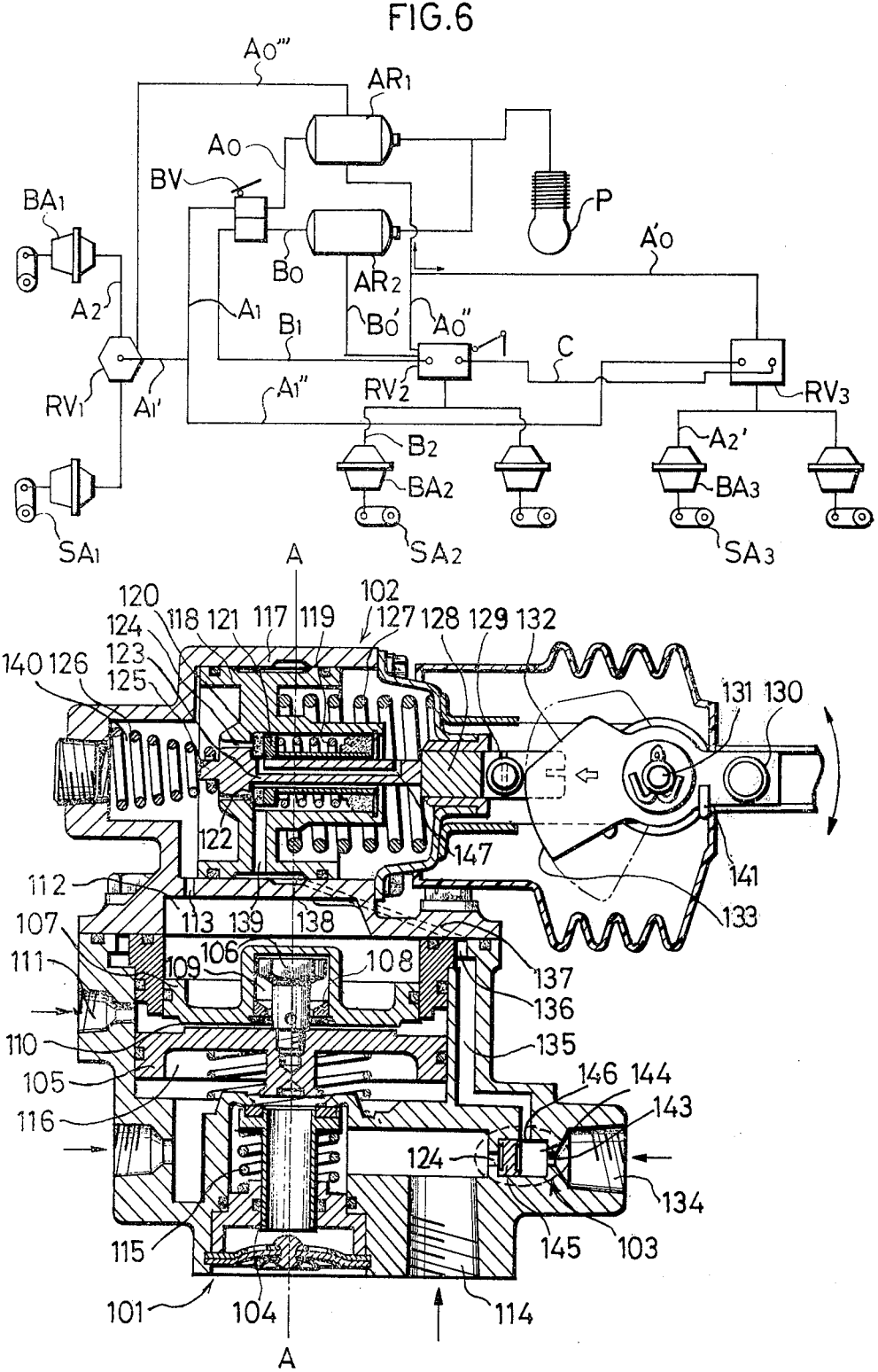

FLUID-PRESSURE REGULATING VALVE

This invention relates to a fluid-pressure regulating valve for supplying a control pressure adjusted to suit the vehicle payload to pressure-proportioning relay valves installed in split air brake systems, particularly of heavy duty vehicles.

Before proceeding to the detailed description of the pressure regulating valve of the invention, the construction of a typical split air brake system including the regulating valve and the relay valves to be supplied with a control pressure from the regulating valve will be briefly outlined. Referring to FIG. 1, which is a schematic diagram of the system, the indicated pressure route in the first half of the system comprises a first air reservoir $AR_1$, a line $A_0$ a brake control valve BV, a line $A_1$, a line $A_2$, a relay valve $RV_1$ for front wheels, a line $A_1''$, and a pressure-proportioning relay valve $RV_3$ for rearward rear wheels. The brake pressure is supplied from the first air reservoir $AR_1$ through line $A_0'''$ to the relay valve $RV_1$, and thence via lines $A_2$ to front wheel brake actuators $BA_1$ causing them to actuate slack adjusters $SA_1$. At the same time, the pressure from the same source is transmitted through line $A_0'$ to the relay valve $RV_3$, and through lines $A_2'$ to brake actuators $BA_3$ for the rearward rear wheels causing them to actuate slack adjusters $SA_3$. On the other hand, the comparative indicated pressure route in the second half of the system comprises a second air reservoir $AR_2$, a line $B_0$ the brake control valve BV, a line $B_1$ and a pressure-proportioning relay valve $RV_2$ for frontward rear wheels. The brake pressure from the second air reservoir $AR_2$ flows through line $B_0'$ to the relay valve $RV_2$, and thence via lines $B_2$ to brake actuators $BA_2$ for the frontward rear wheels causing them to actuate slack adjuster $SA_2$.

The pressure regulating valve of the invention, indicated by the abbreviation PRV, supplies a controlled pressure to the pressure-proportioning relay valves $RV_2$, $RV_3$. The valve is connected to lines $A_0'$ and $B_0'$ through lines $A_0''$ and $B_0''$, respectively, and a pressure controlled by the valve to meet the load condition is transmitted to the relay valves $RV_2$ and $RV_3$ via lines C and C'.

As will be described later, the pressure regulating valve according to the invention has additional functions of a double check valve, so that it receives the higher of the brake supply pressures available from either the first or second air reservoir, and transmits a control pressure of the same intensity to the two relay valves $RV_2$, $RV_3$. With such a split air brake system, failure of either air reservoir allows the other to operate the system and stop the car.

The above and other objects and advantages of the present invention will become apparent from the following description taken in conjunction with the accompanying drawings, wherein:

FIG. 5 is a vertical sectional view of another embodiment of the invention; and FIG. 6 is a schematic diagram similar to FIG. 1 but incorporating the valve shown in FIG. 5 in place of the regulating valve PRV and the relay valve $RV_2$ in the former.

Figure 1:
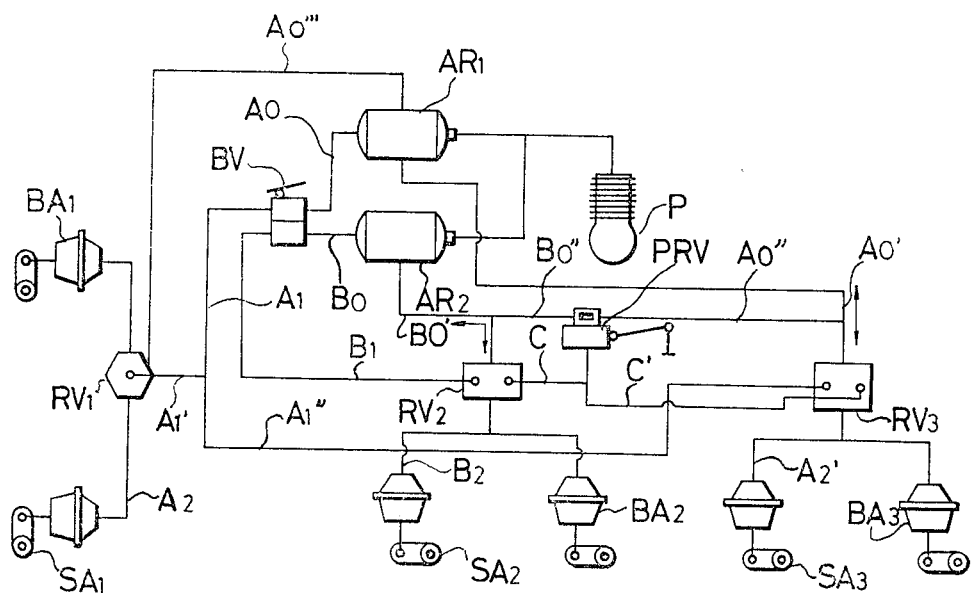
FIG. 1 is a schematic diagram of a typical split air brake system using a pressure regulating valve embodying the invention.
Figure 2:
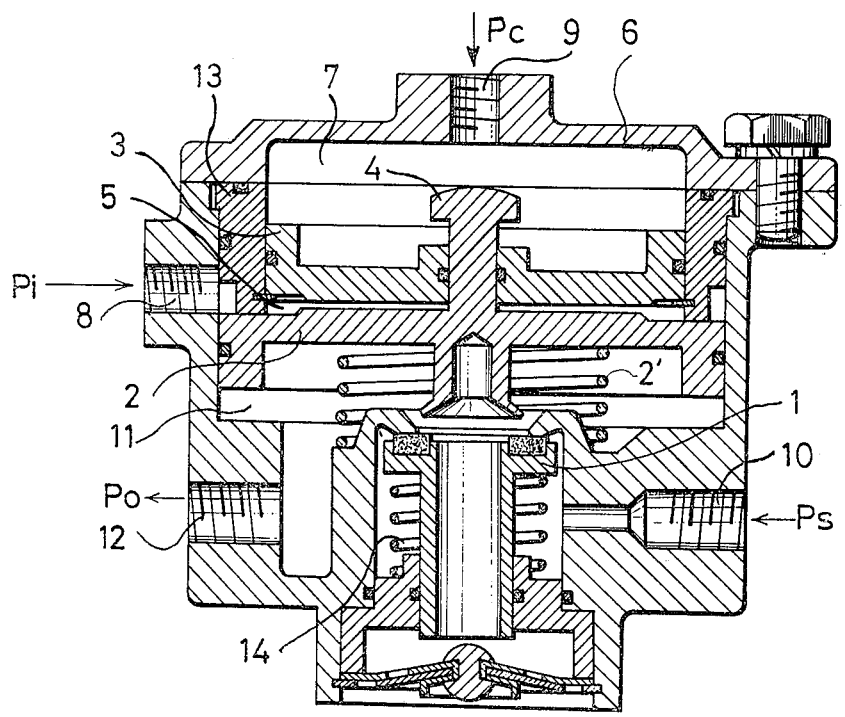
FIG. 2 is a vertical sectional view of a typical relay valve to which the output pressure from the pressure regulating valve of the invention is supplied as a control pressure.

Now, the functions of the pressure-proportioning relay valves ($RV_2$ and $RV_3$ in FIG. 1) for receiving the control pressure from the pressure regulating valve in accordance with the invention will be explained with reference specifically to FIG. 2, which shows a typical construction of such relay valves in vertical section. The valve essentially comprises a valve disk 1 having an exhaust bore in the axial center and normally kept in a closed position by dint of supply pressure and spring force, and a control piston assembly which consists of a first pressure-responsive piston 2 and a second pressure-responsive piston 3. The both pistons are engaged together by a stopper 4 formed at the front end of an upward protrusion from the first piston 2. An indicated pressure chamber 5 is formed between the both pressure-responsive pistons, and a control pressure chamber 7 is formed between the upper surface of the second piston 3 and the inner wall of the valve bonnet 6. Into the respective chambers an indicated pressure Pi and a control pressure Pc are admitted through ports 8 and 9.

Introduction of an indicated pressure Pi into the chamber 5 causes the first pressure-responsive piston 2 to move downward against the force of a spring 2', with its downward protrusion pushing the valve disk 1 downward. As the valve disk 1 is forced down to open the valve, a supply pressure Ps led in through a port 10 enters an output pressure chamber 11, thus producing an output pressure Po therein. The output pressure serves its purpose in the state where its tendency to force the first pressure-responsive piston 2 upward is balanced with the force with which the valve disk 1 is pushed downward in the manner described.

When a control pressure Pc adjusted according to the payload of the vehicle is conducted into the control pressure chamber 7, it acts against the upper surface of the second pressure-responsive piston 3 to push the piston downward. This downward force is offset by the upward force produced by the indicated pressures Pi against the underside of the second piston. In this way the effective downward force of the first piston is adjusted by the payload of the vehicle, and a corresponding output pressure Po is obtained in the output pressure chamber 11.

The present invention concerns improvements of a fluid-pressure regulating valve for supplying a control pressure in proportion to the payload of the vehicle to the pressure-proportioning relay valves in the split type brake systems. More particularly, the invention aims at providing a pressure regulating valve simple in construction, improved in safety, and easy to manufacture.

Figure 3:
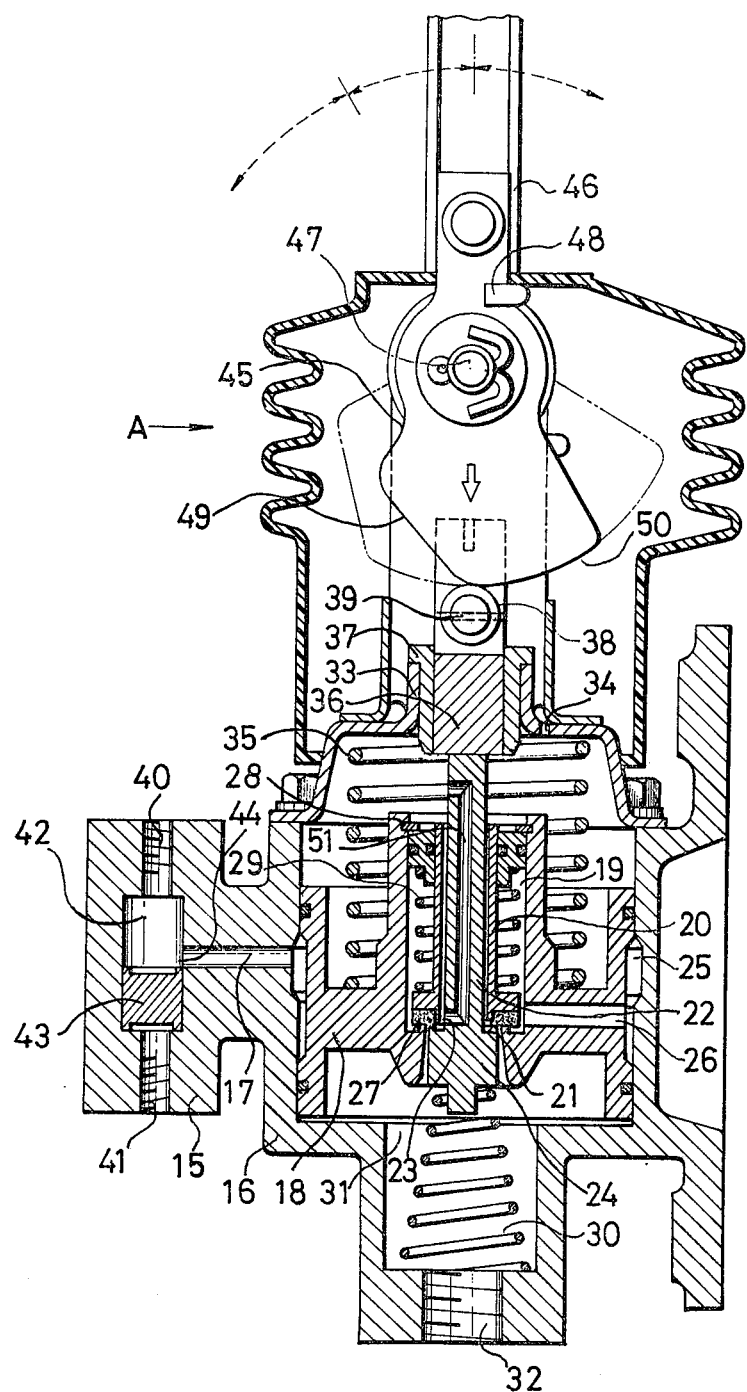
FIG. 3 is a longitudinal sectional view of a pressure regulating valve according to the invention.
Figure 4:
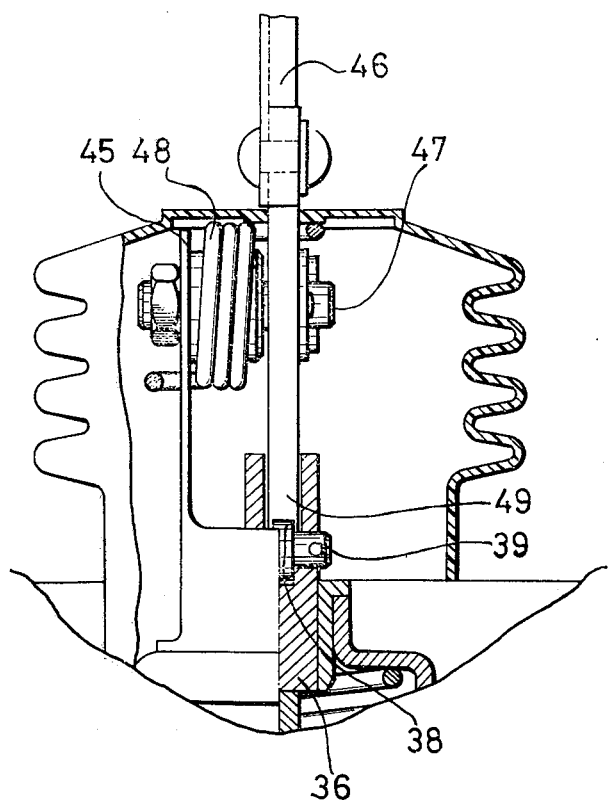
FIG. 4 is a fragmentary sectional view as seen from the side of an arrow A in FIG. 3.

The invention will be better understood from the following description taken in connection with the accompanying drawings, particularly FIGS. 3 and 4, which illustrate an embodiment thereof.

The valve body 15 has a longitudinal cylindrical casing 16 in its middle part, and the casing in turn contains a valve assembly for adjusting the supply pressure from a passage 17 according to the payload of the vehicle. The valve assembly comprises a pressure piston 18 movable longitudinally in sliding contact with the surrounding wall of the casing, a supply valve 20 seated in a supply pressure chamber 19 open in the center boss of the piston 18, an exhaust valve seat 21 engaged end-to-end with the supply valve 20, and an exhaust valve 24. The last-mentioned valve has an upward protrusion 22 formed with a center bore as an exhaust passage 51, which in turn is open in an exhaust bore 23 in the axial center of the supply valve 20. The pressure piston 18 is formed with an annular recess or space 25 on its outer periphery, so that the supply pressure admitted to the space from the passage 17 is thence transmitted to the supply pressure chamber 19 via a passage 26 radially formed through the piston from its outer periphery toward that chamber. The supply valve 20 rests on a seat 27 and is normally held in the closed position by a spring 29 disposed between the valve body and a holder ring 28. The exhaust valve 24 is loaded with a spring 30 between itself and the valve body 15 to urge the supply valve 20 upward.

An output pressure chamber 31 is defined between the underside of the pressure piston 18 and the inner wall of the valve body. The chamber is designed to receive a supply pressure upon opening of the supply valve 20 and to produce an output pressure, which is then delivered as a control pressure to the control pressure chamber of the pressure-proportioning relay valve (FIG. 2) via an output pressure port 32. The space above the pressure piston 18 is communicated with the atmosphere through a small hole 34 formed in the cover plate 33, and is loaded with a balance spring 35 for offsetting the upward force acting on the underside of the piston 18.

The upward protrusion 22 is pressed at its upper end against the underside of an axially movable plunger 36, which is reciprocably guided by a slide bearing 37 provided in the upper middle opening of the cover plate 33. A roller 38 is mounted on the upper part of the plunger 36 by a pin 39.

On the left side of the valve body 15 as viewed in FIG. 3, there is formed a valve unit integral with the valve body and communicated therewith through the supply pressure passage 17. The valve unit, which serves as a double check valve, has a first port 40 and a second port 41, both open on the same axis. A slide valve 43 is reciprocably placed in a cylindrical space 42 provided between the two ports. The first port 40 connects with the first air reservoir $AR_1$, and the second port 41 to the second air reservoir $AR_2$. A third port 44, open in the middle part of the cylindrical space 42, connects with the supply pressure passage 17.

To the upper end of an upward protrusion 45 of the cover plate 33 is secured a pivot 47, which turnably supports a linkwork 46. The pivot 47 carries a spring 48 for biasing the linkwork 46 counterclockwise. The lower end of the linkwork 46 takes the form of a cam engaged with the plunger roller 38. The cam contour includes a working cam face 49 and a lost motion face 50. A change in the payload of the vehicle is transmitted, in terms of a change in the distance between the upper and lower ends of the suspension, to the upper part (not shown) of the linkwork so as to actuate the latter. With an increase in the payload, the linkwork 46 will turn counterclockwise.

The operation of the pressure regulating valve according to the invention, with the foregoing construction, will now be described.

It is assumed that, of the two line pressures of the air brake system connected to the ports 40, 41, the one for the first port 40 is higher. Then, the pressure from the first line will push the slide valve 43 to close the second port 41, admitting a supply pressure through the cylindrical space 42, the third port 44, and the passage 17 into the annular space 25, and thence through the radial passage 26 of the pressure piston 18 into the supply pressure chamber 19.

Loading the vehicle will turn the linkwork 46 counterclockwise, raising the plunger 36 and with it the exhaust valve 24 by dint of the spring 30, and carrying the supply valve 20 away from its seat 27. The supply pressure will pass through the space between the supply valve 20 and the valve seat 27 into the output pressure chamber 31, yielding an output pressure therein. The resulting pressure will act against the underside of the pressure piston 18 to force it upward until the supply valve 20 is seated on the valve seat 27. In this manner an output pressure corresponding to the position of the plungerr 36 or the supply valve 20 is obtained and transferred as a control pressure Pc to the control pressure chamber 7 of the pressure-proportioning relay valve.

Additional loading of the vehicle will turn the linkwork 46 further counterclockwise, raising the plunger 36 to a higher level and opening the supply valve 20 to a greater extent. This results in a higher output pressure or control pressure Pc to be transmitted to the relay valve for more powerful braking action by the brake actuators.

In case of a pressure drop or other trouble with the first air reservoir for some reason or other, the second line pressure will become relatively high and will force the slide valve 43 downward to close the first port 40. The supply pressure will then flow from the second port 41, through the cylindrical space 42, the third port 44, and the passage 17, into the valve assembly to enable the assembly to function in the same manner as already described.

If the vehicle is unloaded or otherwise freed of the load, the linkwork 46 will turn clockwise, forcing the plunger 36 downward and with it the exhaust valve seat 21 away from the valve. Thereupon, the pressure from the output pressure chamber 31 will be released to the atmosphere by way of the exhaust bores 23, 51, and the small hole 34 of the cover plate, thus reducing the control pressure in the relay valve.

Should the linkwork 46 for sensing the vehicle payload be broken or go out of order, it will be turned counterclockwise by the safety spring 48. Consequently, the plunger 36 and with it the supply valve 20 will be raised away from the valve seat 27 and an adequate supply of the output pressure will be ensured.

FIG. 5 shows a combined load-sensing pressure-proportioning relay valve incorporating the present invention, as comprising a relay valve 101, a pressure regulating valve 102 held on its side and mounted on the relay valve, and a double check valve 103 provided in the proximity of the relay valve.

The relay valve 101 is composed of a valve disk 104 having an exhaust bore in the axial center, and a control piston assembly for moving the valve disk 104 to open the valve according to the payload of the vehicle. The control piston assembly comprises a first pressure-responsive piston 105 having a downward protrusion and engaged with the valve disk through an exhaust valve seat formed at the lower end of the protrusion, and a second pressure-responsive piston 107 engaged with the first piston 105 via an enlarged stopper 106 formed at the upper end of an upward protrusion of the first piston. A washer 108 is fitted, with the aid of a snap ring, in the lower part of the center bore 109 of the second pressure-responsive piston 107, so that the stopper 106 of the first piston is kept from slipping off from the center bore 109 of the second piston.

Between the upper surface of the first pressure-responsive piston 105 and the underside of the second piston 107, there is defined an indicated pressure chamber 110, which receives an indicated pressure via a port 111. A control pressure chamber 112 is formed between the upper surface of the second piston and the inner wall of the pressure regulating valve casing to receive, as a control pressure, the output pressure from the pressure regulating valve 112 through an orifice 113.

The valve disk 104 is biased upward by a spring 115 and by a supply pressure from a port 114, and the valve is thereby normally closed. Upon application of an indicated pressure to the indicated pressure chamber 110 due to operation of the brake valve, the control piston assembly is pushed downward with a force equal to the differential between the pressure-receiving areas of the two pressure-responsive pistons multiplied by the indicated pressure. As a result, the valve disk 104 is pushed open by means of the downward protrusion of the first pressure-responsive piston 105. As the valve disk 104 is forced open, and the supply pressure flows into the output pressure chamber 116, producing an output pressure therein, which acts on the underside of the first pressure-responsive piston 105 to push it upward. At the point where the downward force developed by the indicated pressure is balanced with the upward force by the output pressure, a service output pressure or brake apply pressure is obtained.

Now if a control pressure corresponding to the vehicle payload is introduced from the pressure regulating valve 102 into the control pressure chamber 112 through the orifice 113, a downward force will be exerted against the upper surface of the second pressure-responsive piston 107, the force being offset by the upward force produced by the indicated pressure. This will increase the effective depressing force of the control piston assembly, and hence an increase in the force with which the valve disk 104 is opened. Thus, a sufficient output pressure corresponding to the payload will be obtained for adequate braking of the laden vehicle.

The pressure regulating valve 102 comprises a valve assembly for adjusting the supply pressure and a displacement transmission mechanism for controlling the valve assembly according to the payload of the vehicle. The valve assembly consists of a pressure piston 118 reciprocable along the inner wall of the valve casing 117, a supply valve 121 accommodated in a supply pressure chamber 119 in the piston 118 and seated on a supply valve seat 120, an exhaust valve 125 formed with an upward protrusion 123 having an exhaust valve seat 122 for engagement with the supply valve 121 and also having an axial exhaust passage 147, said upward protrusion 123 extending through an exhaust bore 124 in the axial center of the supply valve 120, a loading spring 126 biasing the supply valve 121 into the open position via the exhaust valve 125, and a balance spring 127 disposed on the atmosphere side of the pressure piston 118. The displacement transmission unit is composed of a plunger 128 in contact with the upward protrusion 123 of the exhaust valve, and a linkwork 130 having a cam contour engageable with a roller 129 mounted on the plunger 128. The right-hand end of the linkage 130 which is not shown can be displaced by a change in the payload of the vehicle, so that the linkage as a whole is thereby turned about a pivot 131. The cam contour includes a working cam face 132 and a lost motion cam face 133. With an increase in the vehicle payload, the linkage 130 is turned counterclockwise until the roller 120 comes into contact with the working cam face 132.

A supply pressure flows from either the supply pressure port 114 or an auxiliary supply pressure port 134, through a passage 135 formed in the relay valve body, an annular groove 136 formed on an upper flange of the valve body, a passage 137 formed in the pressure regulating valve body, an annular space 138 around the outer periphery of the pressure piston 118, and a radial passage 139 in the pressure piston, and finally enters the supply pressure chamber 119. Because the supply valve 121 is kept open by the spring 126 via the exhaust valve 125, the pressure passes through the space between the supply valve and its valve seat 120, into an output pressure chamber 140, giving birth to an output pressure therein. The output pressure acts on the left-hand pressure-receiving face and pushes the pressure piston rightward against the force of the balance spring 127 until the spacing between the supply valve 121 and the valve seat 120 is reclosed. In this way an output pressure corresponding to the amount of opening of the supply valve 121 is obtained, and the pressure is admitted, as a control pressure, into the control pressure chamber 112 of the relay valve via the orifice 113. The amount of opening of the supply valve 121 is preselected on the basis of the vehicle payload by way of the exhaust valve 125, plunger 128, and linkage 130. Therefore, the output pressure, or the control pressure applicable to the relay valve, is adjusted according to the load condition of the vehicle.

For the safety of the brake system operation, it is desirable that the supply valve 121 of the pressure regulating valve be fully opened if the displacement transmission mechanism is broken or in trouble. This is realized in the embodiment shown in FIG. 5 by a safety spring 141 mounted on the pivot 131 of the linkwork and which biases the linkwork counterclockwise. Normally the payload of a vehicle is sensed in terms of the distance between the upper and lower ends of the suspension and is transmitted as such to the linkwork. If the transmission mechanism is broken, the linkwork will turn counterclockwise, drawing the plunger 128 rightward under the urging of the loading spring 126 via the exhaust valve 125, until the roller 129 contacts the working cam face 132. The rightward movement of the plunger 128 will open the supply valve 121 to admit the supply pressure into the output pressure chamber. As described, the use of the safety spring 141 improves the safety of the brake circuit operation.

The double check valve 103 is incorporated in the combined structure, between the supply pressure port 114 and the auxiliary supply pressure port 134 of the relay valve 101. A first port 142 connects with the supply pressure port, and a second port 143 connects with the auxiliary supply pressure port. Between the two ports is provided a cylindrical space 144, which contains a slide valve 145. A third port 146 is formed through the inner side wall of the cylindrical space 144, and connects with the passage 135. In the schematic diagram of FIG. 1, for example, the supply pressure port 114 is communicated with the second air reservoir $AR_2$ via line $B_0'$, and the auxiliary supply pressure port 134 with the first air reservoir $AR_1$ via lines $A_0'$, $A_0''$ (FIG. 6).

Now if the pressure in the line associated with the second air reservoir $AR_2$ is higher than in the line of the first air reservoir $AR_1$, the slide valve 145 will move rightward to close the second port 143. This permits the supply pressure to be transmitted to the pressure regulating valve 102 through the supply pressure port 114, the first port 142, the cylindrical space 144, the third port 146, and the passage 135. Conversely if the pressure in the line of the first air reservoir $AR_1$ is higher, the slide valve 145 will move leftward to close the first port 142. The supply pressure from the first air reservoir line will then be fed to the pressure regulating valve 102 through the auxiliary supply pressure port 134, the second port 143, the cylindrical space 144, the third port 146, and the passage 135.

Although the invention has been described in connection with the components of the combined load-sensing pressure-proportioning relay valve incorporating the invention, namely, the relay valve 101, the pressure regulating valve 102, and the double check valve 103, it is to be understood that the embodiments described are illustrative and that numerous changes and modifications are possible without departing from the spirit and scope of the invention as hereinafter claimed.

As has been described, the pressure regulating valve according to the invention is not only positive in action and safe in operation; it is very easy to manufacture because all the valve assembly components are circular or cylindrical in shape and are coaxially fabricated. The double check valve is connected to the regulating valve body not by means of pipe as in conventional arrangements but integrally with the latter body. This eliminates the possibility of any trouble with broken pipe. Moreover, the omission of the pipe simplifies the construction and permits corresponding savings of the manufacturing cost and the space to be occupied by the installation.

It is a feature of the combined load-sensing pressure-proportioning relay valve incorporating the present invention that the pressure regulating valve is solidly mounted on the relay valve with their working axes abutting at right angles to each other. Another feature resides in the provision of the double check valve built in the combined structure, around the supply pressure port of the relay valve body. A further feature is that the three component units of the combination, i.e., the relay valve, pressure regulating valve, and double check valve, connect with one another through bores, passages, and grooves formed in the body. With these features, the invention offers many advantages some of which are enumerated hereunder.

1. The valve can be limited in overall height and compact in construction, with a minimum space requirement.
2. The control pressure chamber 112 can have a large capacity, which combines with the effect of the orifice 113 to enable the chamber to serve successfully as a damper.
3. There is no possibility of trouble with broken pipe.
4. The valve can be made at low cost.
5. The operative direction of the pressure regulating valve body in which the vehicle-height sensing lever is mounted can be freely changed above the upper flange of the relay valve body, with respect to the relay valve body, about the axis A—A in FIG. 5.
6. The combined structure may be divided into the component units of the relay valve and the pressure regulating valve by covering the upper flange of the relay valve body and closing the orifice of the pressure regulating valve, so that the units are separately mounted in a vehicle.

What is claimed is:

1. A fluid-pressure regulating valve for adjusting a supply pressure from either of two air reservoirs according to the payload of a vehicle and supplying the adjusted pressure to a control pressure chamber in pressure-proportioning relay valve, the regulating valve comprising: a valve assembly for controlling the supply pressure, said assembly including a pressure piston reciprocably disposed in the valve body and formed with an air passage through the wall on one side, a supply valve accommodated in a supply pressure chamber inside the pressure piston and seated on a valve seat provided at the lower end of the supply pressure chamber, and an exhaust valve having an exhaust valve seat engageable with the supply valve and also having an upward protrusion extended through an exhaust bore formed in the axial center of the supply valve; an output pressure chamber defined between the underside of the pressure piston and the inner wall of the valve body; a balance spring disposed above the pressure piston in communication with the atmosphere to offset the upward force developed by the output pressure to raise the pressure piston; and a loading spring disposed under the exhaust valve to bias the supply valve into the open position via the exhaust valve; said upward protrusion of the exhaust valve being linked at its end with a linkwork movable in response to the vehicle payload.

2. A valve according to claim 1 wherein said valve body has a cylindrical bore coaxial with the exhaust valve and contains a plunger in the bore, the plunger having a lower end in contact with the upward protrusion of the exhaust valve and carrying a roller at the upper end, and said valve further comprises a linkwork turnably supported by a pivot on the upward protrusion of the valve body, a cam formed at the lower end of the linkwork for sliding contact with the roller, and a safety spring for biasing the linkwork in such a manner as to raise the upward protrusion of the exhaust valve, said spring being mounted on the pivot of the linkwork.

3. A valve according to claim 1 which further comprises a valve member having three ports and formed in one piece with the valve body on one side thereof, said valve member being formed with a cylindrical space therein, and a slide valve reciprocably fitted in the cylindrical space, said space being communicated at one end with the first air reservoir via a first port, at the other end with the second air reservoir via a second port, and further with the valve assembly of the fluid-pressure regulating valve through a third port open in a middle port on one side of the cylindrical space.

4. A combined load-sensing pressure-proportioning relay valve comprising: a valve disk formed with an exhaust bore in the axial center thereof; a control piston assembly for controlling the output pressure with which to operate brake actuators; and a pressure regulating valve for supplying a control pressure to the control piston assembly; said control piston assembly being composed of a first pressure-responsive piston and a second pressure-responsive piston, the first piston having a valve seat formed at the lower end of its downward protrusion for engagement with the valve disk, and a stopper of an increased diameter formed at the upper end of its upward protrusion, with a washer fitted in the lower end of a bore for accommodating the stopper, formed in the lower center of the second pressure-responsive piston, to prevent the stopper from slipping down; said first pressure-responsive piston defining an indicated pressure chamber between its upper surface and the underside of the second piston, said second piston also forming a control pressure chamber thereabove; said pressure regulating valve being mounted on the relay valve body in such a way that it receives a supply pressure from a port of the relay valve through passages formed in the relay valve body and the pressure regulating valve body, and controls the opening of a supply valve through the agency of a displacement transmission mechanism which operates according to the payload of a vehicle, so that a control pressure corresponding to the payload can be fed to the control pressure chamber.

5. A valve according to claim 4 wherein said pressure regulating valve comprises: a valve assembly for adjusting a supply pressure; and a displacement transmission mechanism for controlling the valve assembly according to the payload of the vehicle; said valve assembly comprising a pressure piston formed with a radial passage through one side wall and reciprocably disposed in the casing, a supply valve seated on a valve seat projecting on the bottom of the bore of the pressure piston, an exhaust valve having a valve seat engageable with the supply valve and also having an upward protrusion extended through an exhaust bore formed in the axial center of the supply valve, a loading spring for biasing the supply valve into the open position through the exhaust valve, and a balance spring disposed on the pressure piston; said displacement transmission mechanism comprising a linkwork adapted to turn in response to a change in the payload, a plunger engaged at one end with a cam face on the linkwork and in contact with the upward protrusion of the exhaust valve, and a safety spring fitted on a pivot of the linkwork to bias the linkwork into the direction where the loading spring forces the plunger upward; said pressure regulating valve including the valve assembly and the displacement transmission mechanism being mounted on the relay valve including the valve disk and the piston assembly, with the axis of the regulating valve body directed at right angles to that of the relay valve body.

6. A valve according to claim 5 wherein a control pressure port for feeding a supply pressure to the pressure regulating valve consists of a second port communicated with a first air reservoir and a first port communicated with a second air reservoir, forming therebetween a cylindrical space in which a slide valve is reciprocably fitted, and a third port is open in the middle part of a side wall of the space, in communication with the pressure piston of the pressure regulating valve through passages formed in the relay valve body and the regulating valve body, so that the higher of the supply pressures from the air reservoirs is selectively supplied to the pressure regulating valve, with either of the ports associated with the air reservosirs being a supply pressure port of the relay valve.

* * * * *